UNITED STATES PATENT OFFICE.

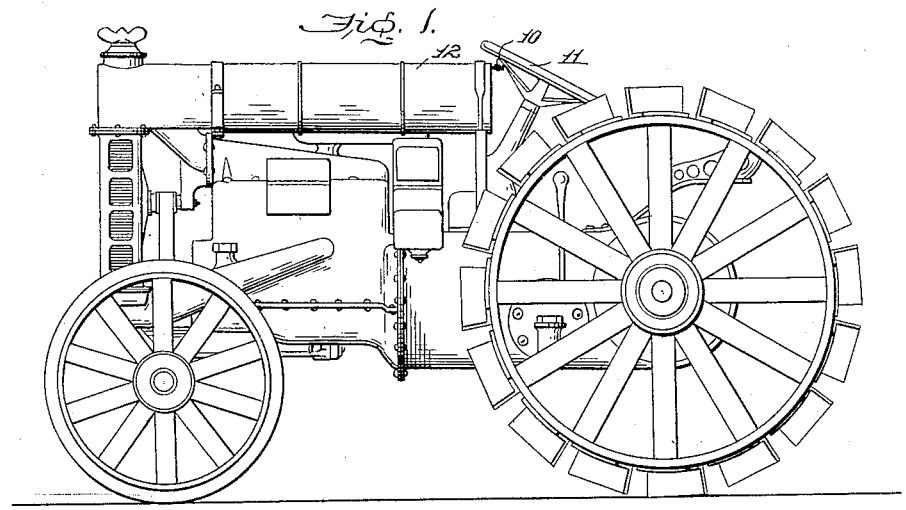

BENJAMIN H. PEGRAM, OF LINCOLN, ILLINOIS.

AUTOMATIC STEERING ATTACHMENT FOR MOTOR-VEHICLES.

1,354,417.　　　　　Specification of Letters Patent.　　Patented Sept. 28, 1920.

Application filed September 18, 1919. Serial No. 324,381.

*To all whom it may concern:*

Be it known that I, BENJAMIN H. PEGRAM, a citizen of the United States, residing at Lincoln, in the county of Logan and State of Illinois, have invented Automatic Steering Attachments for Tractors, of which the following is a full and complete specification.

My invention is an improvement in motor vehicles, and relates more especially to tractors of that particular type employed in the operation of agricultural machines and implements.

In the operation of a tractor for the purpose of drawing a plow across a field it is customary to have the tractor, which is in advance of the plow, run with a traction and a guiding wheel at one side in a previously made furrow so that the direction of the tractor is maintained to some extent thereby; but ordinarily the operator is required to remain at the steering-wheel in order to prevent the tractor from veering to one side by keeping the guiding-wheel in the furrow against the landside thereof to overcome the tendency of said guiding-wheel to climb or ride up the plowed side of said furrow; and as the plow frequently needs to be cleared of trash the operator must stop the machines while attending to this additional work or have the services of a helper to do it.

It is the purpose of my invention in the present instance to provide a simple and effective attachment that will operate the steering mechanism or steering-wheel automatically to direct the travel of the tractor so that the guiding-wheel in the previously made furrow will have a tendency to bear against the landside thereof; thus permitting the operator to give his attention to watching the plow and keeping it clear of trash after starting the machines across the field. I accomplish this by a tension device, for instance a spring, fastening one end thereof to a stationary part of the tractor and the other end to the steering-wheel so as to exert a slight pulling force on said steering-wheel that will direct the guiding-wheel that is in the furrow against the landside thereof thus obviating any tendency of said guiding-wheel to climb the plowed side of said furrow.

In the present instance I have shown and described the preferred form of device for accomplishing the purpose; but it will be understood, of course, that some other contrivance than the spiral spring may be employed that will exert a yielding pull or automatically guide the steering-wheel under tension, and that the location of said guiding device with respect to the steering mechanism of the tractor may be changed and consequently attached to some other part of the mechanism, without departing from the spirit of my invention and scope of the appended claims.

In the accompanying drawings:

Figure 1 is a side view illustrating the application of my automatic steering attachment to a tractor of a conventional type.

Fig. 2 is a plan view, enlarged, showing the attachment and parts of the tractor to which it is applied.

Fig. 3 is a detail view of the clamp by which one end of the attachment is connected to the tractor.

Figs. 4 and 5 are views showing different forms of fixtures for the steering-wheel.

Fig. 6 is a modification hereinafter referred to.

For the purpose of illustrating the application of my invention I have shown it applied to a well known type of tractor now commonly used in drawing plows and operating other agricultural machines and implements, and in this instance the automatic steering device or guiding attachment is attached to the steering-wheel and to the flanged end of the fuel tank, which latter is located conveniently near said steering-wheel and provides the required stationary part of the tractor; but, as will be clearly obvious, the attachment may be applied to other types of tractors.

In carrying out my invention I make the yielding steering attachment or guiding device in the form of a coiled spring 10, with the terminals bent to provide an eye 10ª and hook 10ᵇ at the opposite ends thereof, said spring being preferably made of spring wire of a suitable gage, according to the type or size of tractor to which it is to be applied, to give the required tension, and attach the same at one end to a part of the steering mechanism of the tractor, as for instance the steering-wheel 11, and at the other end to a stationary part of said tractor, as the rear end of the fuel tank 12.

In order to effect the connection of the coiled spring to the parts of the tractor mentioned I employ a suitable clamp 13 for adjustment on the flange 12ª of the fuel tank and a loop or eye 14 on a spoke 11ª of the steering-wheel; said spring being connected by the eye 10ª to the clamp and by the hook 10ᵇ to the eye on the spoke; the means last mentioned permitting the attachment or spring to be readily disconnected when not required in use.

Although any form of clamping device may be used which will provide for the adjustment of the steering attachment on the flange 12ª of the fuel tank 12, so that the said attachment or spring may exert the proper pulling force or tension on the steering-wheel, the clamp herein shown is effective for the purpose as it permits of quick and convenient adjustment. This clamp consists of spring jaws 13ª, 13ª, suitably spaced apart to receive the flange 12ª of the fuel tank, with a bolt 15 passed transversely through the jaws to receive a nut by which the jaws are clamped on said flange, the body portion of the clamp having an apertured ear 16 by which the attachment or spring 10 is permanently connected thereto.

The loop or eye by which the attachment or spring is connected to the steering-wheel may be formed on a spoke of said steering-wheel or applied thereto in the form of a fixture, the latter means of connection being preferable as it provides for convenient application of the steering attachment to tractors now in use; and for this latter reason I prefer the form of fixture shown in Fig. 4, comprising two members or plates 17 and 18, with bolts 19 for clamping said plates on the spoke, one, as 18, having the eye 18ª to receive the hook 10ᵇ of the spring. In the modification of fixture, shown in Fig. 5, a single plate 20 is used, being provided with the attaching-eye 20ª and having holes by which it may be riveted on the spoke, but, of course, in this instance holes would have to be drilled through said spoke.

In applying the attachment the clamp 13, carrying the spring 10, is first adjusted on the rear end of the fuel tank with respect to the steering-wheel so that when the spring is connected to the spoke of said steering-wheel it will tend to turn the latter in one direction, to the right or left according to which side of the spoke the clamp is located and consequently tend to turn the guiding-wheels of the tractor in the same direction, and of course the tension or pulling force exerted by the spring may be regulated by adjusting the clamp on the fuel tank to increase or decrease the distance between the clamp and spoke. As the purpose of the attachment is to keep the guiding-wheel which runs in the furrow against the landside thereof it is arranged to act on the steering-wheel to exert a yielding force to turn said guiding-wheel so that it will continually bear against the landside thus preventing it from climbing the opposite or plowed side of the furrow. Therefore after the tractor is started across the field the operator may leave his seat and follow the plow to clear away any trash collected thereby. When not in use the spring is unhooked from the spoke of the steering-wheel and will hang suspended from the clamp that is attached to the rear end of the fuel tank.

Instead of attaching the clamp to the fuel tank—the most convenient point in a tractor of the type herein shown—said clamp may be attached to any other stationary part of a tractor, inasmuch as in some types the fuel tank may not be located near the steering-wheel; but as the attachment in the present instance consists of the spring 10, clamp 13, and attaching fixture for the spoke of the steering-wheel its attachment to a stationary part of the tractor is optional or dependent on conditions. Furthermore, it may be applied with equal effect to some other part of the steering mechanism; for instance the fixture shown in Fig. 4 may be clamped on the transverse steering rod below the radiator and the clamp applied to the flange at the lower end of said radiator, but of course the spring would have to be longer or provided with extended terminal members.

The modification, Fig. 6, shows the application of the attachment as hereinabove last mentioned, in which the apertured ear 21ª of clamp 21 on the flange of the radiator is lengthened, and two fixtures 22, 22, as shown in Fig. 4, are clamped on the transverse steering-rod 23, so that the coiled spring 24 can be shifted from one of said fixtures to the other and thereby change the direction of pull and consequently the guiding wheels 25 of the tractor are turned under tension of the spring.

Having described my invention, I claim:

1. An attachment for tractors for exerting a yielding pull on the steering mechanism to turn the guiding wheels in one direction comprising a clamp having jaws to engage a stationary part of the tractor; a clamping bolt extending through the jaws near the inner ends thereof, and an apertured lug projecting from the body portion of the clamp; together with a spiral spring attached at one end to the apertured lug on the clamp and formed into a hook at its other end, and a detachable fixture for attachment to a part of the steering mechanism consisting of a plate with an eye to receive the aforesaid hook on the spring, and means on the plate for securing the same to said steering mechanism.

2. An attachment for tractors for exerting a yielding pull on the steering mechanism to turn the guiding wheels in one direction comprising a clamp having projecting spring metal jaws to engage the flange of a stationary part of the tractor, a clamping-bolt extending through the jaws near the inner ends thereof, and an apertured lug projecting from the body portion of said clamp; together with a spiral spring attached at one end to the apertured lug of the clamp and formed into a hook at its other end, and a detachable fixture for attachment to a part of the steering mechanism consisting of a plate with an eye to receive the aforesaid hook on the spring, a companion plate, said plates having apertures, and bolts engaging the apertures to connect the plates.

BENJAMIN H. PEGRAM.